United States Patent [19]

Blanton et al.

[11] Patent Number: 4,803,836

[45] Date of Patent: Feb. 14, 1989

[54] METHOD AND APPARATUS FOR FEEDING AN EXTRUDABLE FUEL TO A PRESSURIZED COMBUSTION CHAMBER

[75] Inventors: John C. Blanton; Anthony H. Furman, both of Scotia, N.Y.

[73] Assignee: General Electric Company, Schenectady, N.Y.

[21] Appl. No.: 141,863

[22] Filed: Jan. 6, 1988

Related U.S. Application Data

[63] Continuation of Ser. No. 903,369, Sep. 3, 1986, abandoned, which is a continuation of Ser. No. 628,668, Jul. 6, 1984, abandoned.

[51] Int. Cl.[4] ............................................. F02C 3/26
[52] U.S. Cl. .................................. 60/39.464; 110/110
[58] Field of Search ............... 60/39.464, 39.48, 734; 110/104 R, 110, 114

[56] References Cited

U.S. PATENT DOCUMENTS

| | | | |
|---|---|---|---|
| 1,726,870 | 9/1929 | Trent | 60/39.464 |
| 1,779,647 | 10/1930 | Van Brunt | 110/104 R |
| 1,856,134 | 5/1932 | McLaughlin et al. | 110/104 R |
| 1,931,181 | 10/1933 | Culver | 110/104 R |
| 2,509,246 | 5/1950 | Ramsey | 60/39.464 |
| 2,932,712 | 4/1960 | Levin | 110/110 |
| 3,271,951 | 9/1966 | Nettel | 60/39.464 |
| 3,989,433 | 11/1976 | Furman | 425/149 |
| 4,025,262 | 5/1977 | Furman | 425/145 |
| 4,049,390 | 9/1977 | Furman | 44/10 |
| 4,049,392 | 9/1977 | Furman | 44/10 |
| 4,191,535 | 3/1980 | Furman | 44/10 |

Primary Examiner—Louis J. Casaregola
Assistant Examiner—Timothy S. Thorpe
Attorney, Agent, or Firm—William H. Steinberg; James C. Davis, Jr.; Paul R. Webb, II

[57] ABSTRACT

A method for feeding an extrudable fuel into a pressurized combustion chamber includes extruding the fuel through a screw extruder and introducing the extruding fuel into the chamber through a passage at the end of the extruder. The passage has reduced cross-sectional area compared to that of the extruder, so that extruded fuel is compacted and provides a pressure seal for the chamber. The compacted fuel is atomized as it is introduced into the combustion chamber, so that the fuel is broken up into particles and dispersed into the chamber. Apparatus for carrying out the invention includes a screw extruder having a helically shaped screw of constant radius affixed to the outer surface of a rotatable shaft. A frusto-conically shaped member is attached to the end of the shaft and disposed through the end of the extruder so that an annular opening is defined between the outer surface of the member and the inner surface of the extruder body. The apparatus also includes an atomizing gas channel for directing an atomizing gas against compacted fuel as it is introduced into the combustion chamber.

3 Claims, 2 Drawing Sheets

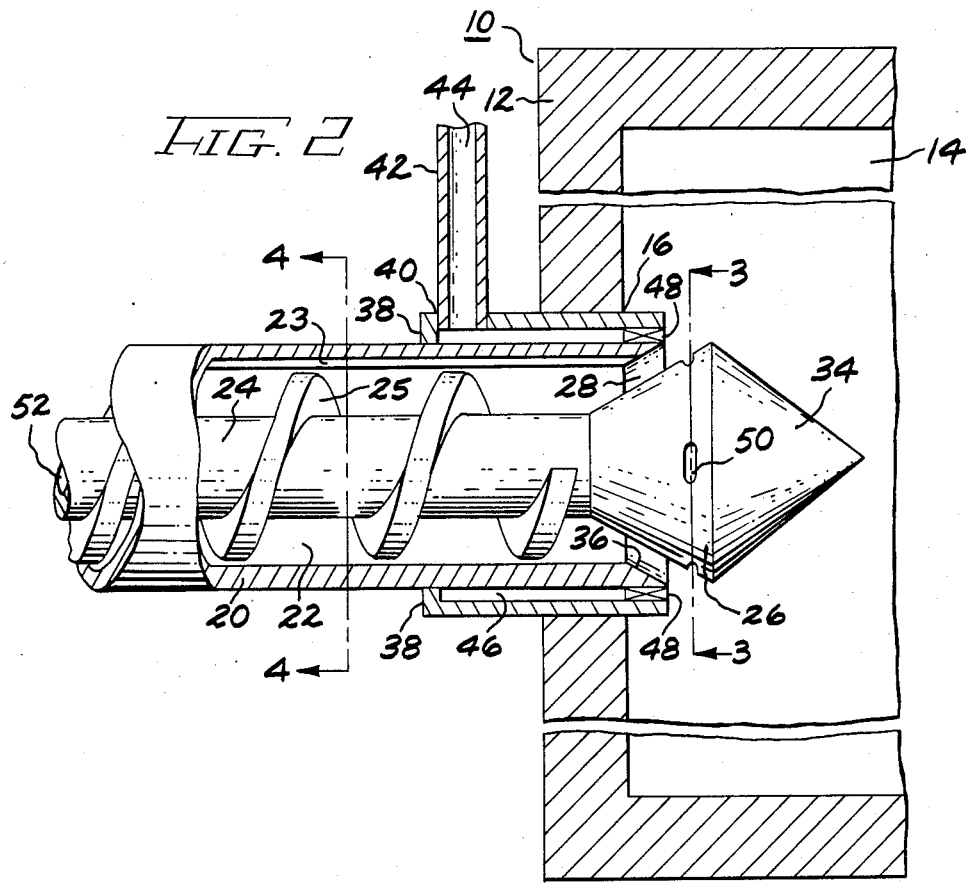
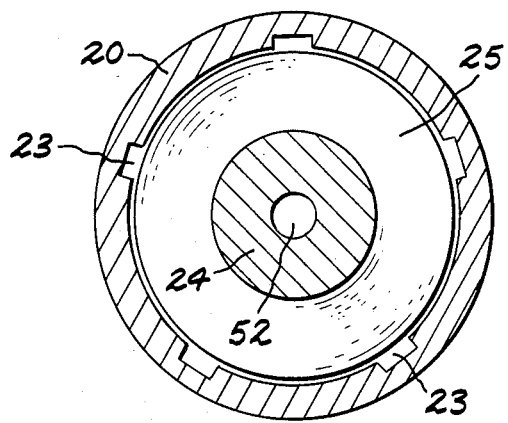

METHOD AND APPARATUS FOR FEEDING AN EXTRUDABLE FUEL TO A PRESSURIZED COMBUSTION CHAMBER

This application is a continuation, of application Ser. No. 903,369, filed 9/3/86 which is a continuation of Ser. No. 628,668, filed on July 6, 1984, both now abandoned.

BACKGROUND OF THE INVENTION

This invention relates to a method and apparatus for feeding an extrudable fuel into a pressurized combustion chamber in such a manner that an elevated pressure is maintained in the combustion chamber, and that fuel is introduced into the chamber at a constant, controllable rate. More particularly, this invention relates to using an extruder having an outlet opening of reduced cross-sectional area relative to the area of the extruder, to transport the fuel to the combustion chamber and to compact fuel particles at the point of introduction into the chamber. The compacted fuel is used to provide a pressure seal for the chamber, and is re-dispersed into particles by an atomizing means, as the fuel is introduced into the chamber.

With the recent advances in coal beneficiation and micronization, the concept of using coal in direct-fired gas turbine combustors has become more attractive. One of the major problems associated with such a combustor is that coal, being a solid, is difficult to feed in a controlled manner into a pressurized combustor. One method that has been proposed for feeding coal into the combustor is to slurry the coal and introduce it as a liquid. However, there are certain problems which must be considered for a slurry feeding system, including slurry stability, combustion stability, ignition delay, particle agglomeration, the need for water quality control, and the loss of combustion efficiency resulting from high water content required to form the slurry. A dry or near-dry coal feeding method avoids many of these problems and results in higher combustion engine efficiency.

Previous investigators have employed a dry feed concept in direct-fired, coal-burning gas turbine combustors. Two significant problems which have been prevalent in these previous systems are fluctuating fuel flow rates and flow "pulsations" associated with gear-type coal pumps. Modern gas turbine combustors are sophisticated systems requiring accurate fuel flow control. Additionally, some pressurized combustors exhibit significant sensitivity to combustor pulsations.

Furthermore, a number of systems have been employed in the past for extruding coal in various situations. However, prior art coal extrusion systems have not been directed to the problem of feeding coal to a pressurized combustion chamber at a continuous, controllable rate so as to provide stable combustion, and in such a manner that the temperature and pressure in the combustor are maintainable at desired levels for a particular load condition. Also, conventional coal extrusion systems are directed to processes using much larger coal particle sizes than are employed in gas turbine systems.

Accordingly, it is seen that it is an object of the present invention to provide a method for feeding a dry, extrudable fuel to a pressurized combustion chamber at a controllable rate.

It is a further object of the present invention to provide a method for feeding coal into a pressurized combustion chamber so as to provide stable combustion, and so that the temperature and pressure in the chamber are maintainable at a constant, controllable level for a fixed load condition.

It is also an object of the present invention to provide a method for feeding finely ground coal particles into a gas turbine combustor.

It is still another object of the present invention to provide an apparatus for feeding an extrudable fuel into a pressurized combustion chamber at a controllable rate, so that direct firing of the fuel results in stable combustion in the chamber.

SUMMARY OF THE INVENTION

In accordance with one embodiment of the present invention, a method for feeding an extrudable fuel into a pressurized combustion chamber comprises extruding the fuel so as to transport it to the combustion chamber and introducing the extruded fuel into the chaber through a passage having reduced cross-sectional area relative to the passage used for the extruding step, so that the extruded fuel is compacted and provides a pressure seal for the combustion chamber. The compacted fuel is atomized as it is introduced into the combustion chamber, so that the compacted fuel is broken up into particles and dispersed in the chamber. Preferably, the fuel is extruded through a single screw extruder having a constant radius and constant pitch and is introduced into the chamber through an annular passage generally having the shape of a truncated hollow cone, with the cross-sectional area of the passage being adjustable so that the amount of fuel introduced into the chamber may be controlled by adjusting the cross-sectional area of the passage. As the compacted fuel is introduced into the chamber, an atomizing gas, preferably directed in a swirling pattern, is directed against the fuel so as to shatter it into particles and disperse it in the combustion chamber.

In accordance with another embodiment of the present invention, a preferred apparatus for carrying out the present invention comprises an extruder body having a generally cylindrically shaped extrusion channel defined therethrough, with one end of the flow channel being in flow communication with the combustion chamber. A cylindrically shaped, rotatable shaft having a helically shaped screw of constant radius and constant pitch affixed to the outer surface of the shaft is concentrically disposed in the extrusion channel so that rotation of the shaft provides movement of extruded material in an axial direction, toward the combustion chamber. A frusto-conically shaped end member is attached to the shaft and disposed through the end of the extrusion channel so that an annular opening is defined between the outer surface of the end member and the inner surface of the extruder body which defines the extrusion channel. The apparatus also preferably comprises an atomizing body at least partially surrounding the end of the extruder body which is in flow communication with the combustion chamber, so that an atomizing gas channel is defined between the inner surface of the atomizing body and the outer surface of the extruder body, and so that atomizing gas passing through the atomizing gas channel is directed against compacted fuel being introduced into the combustion chamber.

BRIEF DESCRIPTION OF THE DRAWINGS

The subject matter which is regarded as the invention is particularly pointed out and distinctly claimed in the concluding portion of the specification. The invention itself, however, both as to its organization and its method of practice, together with further objects and advantages thereof, may best be understood by reference to the following description taken in conjunction with the accompanying drawings, in which:

FIG. 2 is a similar view schematically illustrating another embodiment of the present invention;

FIG. 4 is a cross-sectional view of the apparatus shown in FIG. 2, taken along line 4—4.

DETAILED DESCRIPTION OF THE INVENTION

Figure 1:
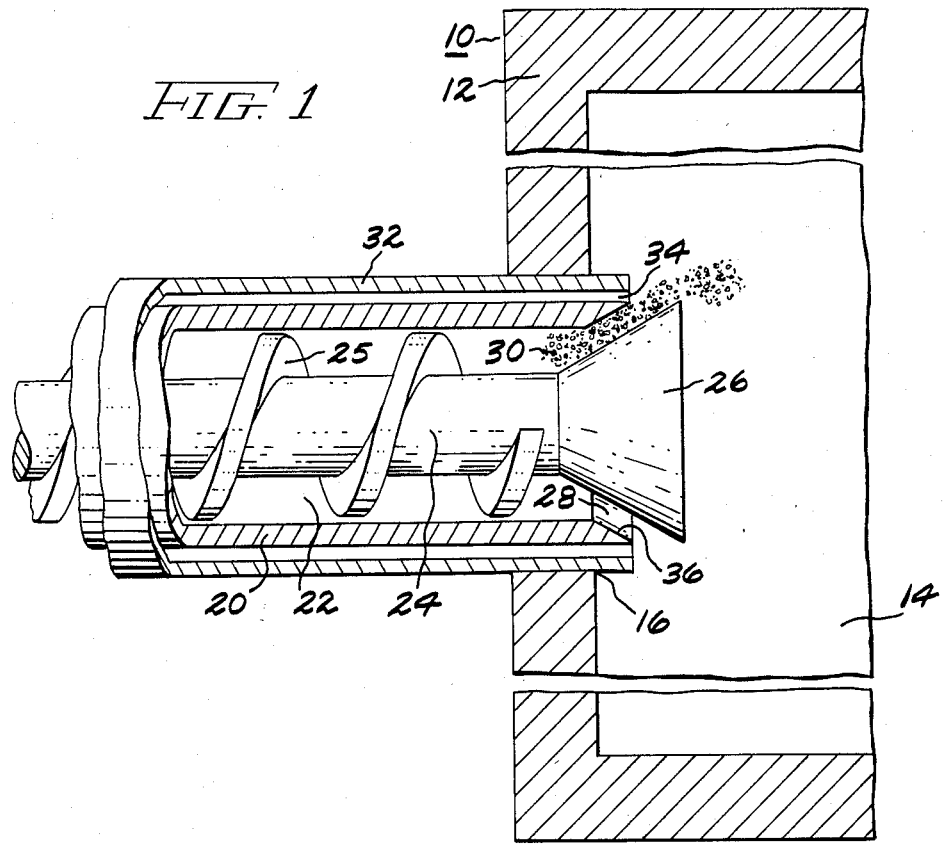
FIG. 1 is a partial cross-sectional, side elevation view schematically illustrating one embodiment of the present invention.

In order to feed an extrudable fuel, such as coal particles, into a pressurized combustion chamber, the fuel must be fed with sufficient pressure to overcome the operating pressure of the chamber. When a porous fuel such as powdered coal is fed into the chamber, the fuel must be compacted at the entry point into the chamber to a degree sufficient to provide a pressure seal for the chamber. However, in order to be directly fired in a manner that provides stable combustion and results in a constant, controllable level of temperature and pressure in the combustion chamber for a particular load condition, the compacted fuel must be re-dispersed in the chamber before being burned. Additionally, in order to prevent combustor pulsations and to provide efficient combustion, the fuel feed rate should be continuous and controllable. In accordance with the present invention, a method which meets these requirements for feeding an extrudable fuel to a pressurized combustion chamber comprises extruding the fuel to transport it to the pressurized combustion chamber. The extruded fuel is introduced into the chamber through a passage having reduced cross-sectional area relative to the passage used for the extruding step, so that the extruded fuel is compacted as it passes through the passage and thereby provides a pressure seal for the pressurized combustion chamber. As the compacted fuel is introduced into the combustion chamber, it is atomized in order to break apart the compacted fuel into particles and to provide dispersal of the particles in the chamber. The inventive method is preferably performed by extruding the fuel through a single screw extruder having a constant radius at the delivery end of the extruder. If the extruder also has a constant pitch screw, then the work energy required for the extrusion step, and the stresses within the extrusion assembly, are reduced. In one embodiment of the inventive method, the extruded fuel is introduced into the combustion chamber through an annular passage at the end of the extruder, with the passage generally having the shape of a truncated hollow cone. Preferably, the cross-sectional area of this annular passage is adjustable, so that the amount of fuel introduced into the combustion chamber may be controlled by adjusting the cross-sectional area of the passage. Further control of the fuel feed rate is provided by adjusting the rate of rotation or the pitch of the extruder screw. One method of atomizing the compacted fuel is to direct an atomizing gas, such as, for example, air, against the fuel as it is introduced into the combustion chamber, so as to shatter the compacted fuel into particles and disperse the particles in the chamber. Preferably, the atomizing gas is directed in a swirling pattern, so that the gas rotates about the central axis of the passage through which the extruded fuel is introduced into the combustion chamber. By directing the atomizing gas in a swirling pattern, the surface area of the compacted fuel that is in contact with the atomizing gas is increased. For some applications, directing the atomizing gas in a swirling pattern also provides better mixing of the fuel particles with combustion gas in the chamber.

By the inventive method described above, extrudable fuel is easily transported to the combustion chamber at a continuous, controllable rate. In practice, the fuel is fed into a hopper at atmospheric pressure, where it is exposed to the screw flights of the extruder. The extruded fuel is compacted at the end of the extruder by being forced through the annular passage, which has a smaller cross-sectional area than the extruder, and by the pressure in the combustion chamber, which provides a compacting force in the opposite direction of that provided by the extruder. The fuel is compacted by these forces to a degree sufficient to provide a pressure seal for the combustion chamber. Adjusting the cross-sectional area of the annular passage provides control of the rate and density at which the compacted fuel is introduced into the chamber. The compacted fuel is broken up into particles by the high velocity atomizing gas that is directed against the fuel. The fuel particles then disperse in the combustion chamber, where they are mixed with combustion gas and burned in a direct-fired combustion process.

To maintain pressure in the combustion chamber when introduction of the fuel into the chamber is discontinued, it is desireable that the cross-sectional area of the annular passage is reducible to the extent that the passage is substantially closed and provides a pressure seal for the chamber, even in the absence of fuel in the annular passage. In this manner, the combustion chamber may be pressurized independently of whether extrudable fuel is being fed into the chamber, and a separate fuel source may even be used to provide combustion in the chamber, such as, for example, a pilot fuel or a secondary fuel used as a backup to the extrudable fuel. Also, for applications where it is desirable, the inventive method may further comprise heating the extrudable fuel to a sufficient temperature to soften the fuel and thereby increase its extrudability. The inventive method may also comprise heating the atomizing gas, so as to increase the efficiency of combustion in the combustion chamber. For example, the atomizing gas may be heated by using the gas as a coolant for the extrusion assembly, whereby the heat energy produced by the work of the extruder heats the atomizing gas. Or, if it is desirable to heat both the fuel and the atomizing gas, hot atomizing gas may be directed to flow over the extrusion assembly before it is used to atomize the compacted fuel. In yet another embodiment, optionally heated atomizing gas may be aimed so that it is directed against the compacted fuel from more than one direction.

The type of extrudable fuel and the size of the fuel particles employed in the present invention depend upon the application involved. Among other applications, the present invention is useful for gas turbine combustors fired with coal particles. For a gas turbine combustor, coal particles in the size range of between about 1 and 10 microns are contemplated. The present invention is also useful for pressurized fluidized bed combustors and entrained bed gasifiers. For those applications, larger coal particle sizes are useful. The form of the extrudable fuel to be employed also depends upon the particular application. The extrudable fuel may be a dry powder, mixed as a paste, or a plasticized compound. For many useful applications, the atomizing gas comprises the same gas as is used for the combustion gas in the chamber. Typically the combustion gas is air. However, for applications where it is desirable to lower the formation of nitric oxide emissions, or for combustors forming part of a combined cycle system, it may be preferable for the atomizing gas to comprise steam.

FIG. 1 schematically illustrates one embodiment of an apparatus suitable for practicing the instant invention. In the embodiment shown, pressurized combustor 10 includes combustion chamber 14 defined in part by combustion chamber wall 12. For the sake of clarity, extrudable fuel 30 is shown only at the end of the extruder, where it is compacted and then atomized and dispersed in chamber 14. It should be understood that, in operation, extrudable fuel 30 is also located throughout the remainder of the extruder passage. Means for extruding fuel 30, to transport it to combustion chamber 14, comprises a single screw extruder having a constant radius. In the embodiment illustrated in FIG. 1, the extruding means comprises extruder body 20 having generally cylindrically shaped extrusion channel 22 defined therethrough. Extrusion body 20 is disposed through aperture 16 in combustion chamber wall 12 so that one end of extrusion channel 22 is in flow communication with combustion chamber 14. Generally cylindrically shaped, rotatable shaft 24 is disposed in extrusion channel 22 so that the central axis of shaft 24 is coaxially located with respect to the longitudinal axis of channel 22. Helically shaped screw 25 preferably has a constant radius and is affixed to the outer surface of shaft 24 so that rotation (in an appropriate direction) of shaft 24 with screw 25 affixed thereto provides movement of extruded material in an axial direction toward combustion chamber 14. As shown in FIG. 1, screw 25 is disposed so that it has a constant pitch. However, screw 25 may also be disposed so that the pitch thereof decreases in the axial direction toward combustion chamber 14.

The apparatus of the present invention also includes means for introducing the extruded fuel into combustion chamber 14 through a passage having reduced cross-sectional area relative to the passage used for extruding the fuel, so that the fuel is compacted and provides a pressure seal for pressurized chamber 14. In the embodiment of FIG. 1, the introducing means comprises generally frusto-conically shaped end member 26 attached to shaft 24, with the central axis of end member 26 being coaxially located with respect to the central axis of shaft 24. End member 26 is disposed through the end of extrusion channel 22 which is in flow communication with combustion chamber 14, so that annular opening 28 is defined between the outer surface of end member 26 and the surface of extruder body 20 which defines extrusion channel 22. Also, in the embodiment shown, the end of extrusion channel 22 which is in flow communication with combustion chamber 14 is beveled radially outwardly, with beveled surface 36, which defines the combustion chamber end of extrusion channel 22, at an angle which substantially corresponds to the vertex angle of frusto-conically shaped end member 26. In this manner, annular opening 28 is defined so that it has the shape of a truncated hollow cone. Although not shown in FIG. 1, the apparatus may further comprise means for adjusting the cross-sectional area of annular opening 28, so that the amount of extrudable fuel 30 introduced into cumbustion chamber 14 may be controlled by adjusting the cross-sectional area of opening 28. For the embodiment of FIG. 1, suitable adjusting means comprises means for moving shaft 24 and end member 26 in the axial direction, so that the axial movement of end member 26 changes the cross-sectional area of annular opening 28. The adjusting means may be further configured so that the cross-sectional area of annular opening 28 is reducible to the extent that opening 28 is substantially closed and provides a pressure seal for pressurized chamber 14, even when there is no compacted fuel in opening 28. With the adjusting means so configured, the apparatus of the present invention may be used to maintain pressure in combustion chamber 14 when introduction of extrudable fuel 30 into chamber 14 is discontinued. Thus, it is seen that frusto-conically shaped end member 26 not only provides an inside surface against which extrudable fuel 30 is compacted and extruded, but also provides a pressure-sealing fuel shut-off surface which mates with extruder body 20 when member 26 is axially retracted into extruder body 20.

Means for atomizing the compacted fuel as it is introduced into combustion chamber 14 may comprise means for directing an atomizing gas against the compacted fuel so as to shatter it into particles and disperse the particles in chamber 14. In the embodiment shown in FIG. 1, the atomizing means comprises atomizing body 32 at least partially surrounding the end of extruder body 12 which is disposed through aperture 16 in combustion chamber wall 12. Atomizing body 32 is disposed so that atomizing gas channel 34 is defined between the inner surface of atomizing body 32 and the outer surface of extruder body 20, and so that atomizing gas passing through atomizing gas channel 34 is directed against the compacted fuel as the fuel enters chamber 14. In the embodiment shown, atomizing gas channel 34 forms an annular ring around extruder body 20, with the ring being concentrically located and adjacent to annular opening 28. The embodiment shown in FIG. 1 has the further advantage that the radially outward angle of the outer surface of end member 26 aids the atomization and dispersal of the compacted fuel as it is atomized by gas passing through channel 34.

In the embodiment shown in FIG. 1, atomizing body 32 extends along the axial length of extruder body 20 for a substantial portion thereof. The embodiment shown is especially useful for applications where it is desirable to employ the atomizing gas as a coolant for the extruder assembly, or to heat the extruder assembly in order to heat the extrudable fuel as it is being transported through the extruder. For other applications, the atomizing means shown in FIG. 2 may be preferred.

In an alternative embodiment of the present invention schematically illustrated in the partial cross-sectional, side elevation view of FIG. 2, atomizing body 38 at least partially surrounds the end of extruder body 20 which is disposed through aperture 16 in combustion chamber wall 12. Atomizing body 38 is disposed so that atomizing gas channel 46 is defined between the inner surface of atomizing body 38 and the outer surface of extruder body 22, in a similar fashion to the atomizing means shown FIG. 1. Atomizing gas supply tube 42 having flow channel 44 defined therethrough is disposed through aperture 40 in the portion of atomizing body 38 which defines the outer radius of atomizing gas channel 46, so that one end of flow channel 44 is in flow communication with channel 46. The atomizing means shown in FIG. 2 further comprises swirl-inducing members, shown in FIG. 2 as schematically illustrated swirl vanes 48, disposed in atomizing gas channel 46 so that atomizing gas passing therethrough is directed in a swirling pattern and rotates about the central axis of annular opening 28.

Figure 3:
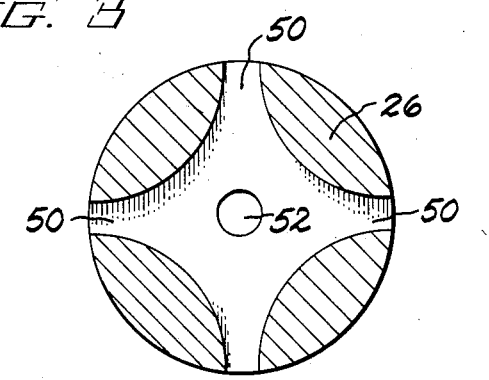
FIG. 3 is a cross-sectional view of the apparatus shown in FIG. 2, taken along line 3—3.

The atomizing means may further comprise means for directing the atomizing gas so that it is directed against the compacted fuel from more than one direction. As shown in FIG. 2, the atomizing means may include a plurality of apertures 50 in frusto-conically shaped end member 26, with apertures 50 being circumferentially arranged in a spaced-apart relationship about the central axis of member 26. As better illustrated in the cross-sectional view of FIG. 3, taken along line 3—3 of the apparatus shown in FIG. 2, in which view the portion of the apparatus which is radially located beyond the outer radius of end member 26 has been omitted for the sake of clarity, each aperture 50 is seen as extending radially from the outer surface of end member 26 to the central axis thereof. Apertures 50 are axially located and disposed so that atomizing gas passing therethrough is directed against the compacted fuel as it is introduced into combustion chamber 14 by passing through annular opening 28. Flow channel 52, for introducing atomizing gas into apertures 50, is defined in shaft 24 and extends axially for at least a portion of the length thereof. Flow channel 52 is disposed so that one end thereof is in flow communication with each of apertures 50.

To aid in the dispersion of atomized fuel particles in chamber 14, the apparatus of the present invention may further comprise dispersion member therefor 35 attached to frusto-conically shaped end member 26 at the axial end of member 26 opposite the axial end thereof which is attached to shaft 24. For illustrative purposes, dispersion member therefor 35 is shown in FIG. 2 as being conically shaped. However, the actual configuration of dispersion member therefor 35 depends upon the particular application involved, with dispersion member 35 being disposed and shaped so as to increase dispersion of the extruded and atomized fuel in combustion chamber 14, and to thereby optimize operation of the combustor.

As also shown in FIG. 2 and better illustrated in the cross-sectional view of FIG. 4 taken along line 4—4, the apparatus of the present invention may further include a plurality of grooves 23 formed in the surface of extruder body 20 which defines extrusion channel 22. Grooves 23 extend radially beyond the outer radius of extrusion channel 22, and extend axially for at least a portion of the axial length of channel 22. The longitudinal axis of each groove 23 is substantially parallel to the longitudinal axis of extrusion channel 22, so that grooves 23 provide resistance to rotation of extruded material in channel 22 and increase the tendency of the extruded material to move in an axial direction toward combustion chamber 14. Furthermore, although not illustrated in the Figures, the apparatus may further comprise means for heating extrudable fuel 30, so as to soften fuel 30 and increase its extrudability. The apparatus may also comprise means for heating the atomizing gas, so as to increase the efficiency of combustion in chamber 14.

The foregoing describes a method for feeding an extrudable fuel to a pressurized combustion chamber at a controllable rate. The present invention provides a method for feeding finely ground coal particles into a pressurized combustion chamber so as to provide stable combustion and so that the temperature and pressure in the chamber remain at a constant, controllable level for a particular load condition. The instant invention also provides an apparatus for feeding an extrudable fuel into a pressurized combustion chamber at a controllable rate, so that direct firing of the fuel results in stable combustion in the chamber.

While the invention has been described in detail herein in accord with certain preferred embodiments thereof, many modifications and changes therein may be effected by those skilled in the art. For example, while many portions of the apparatus illustrated in the Figures has been indicated as comprising metal, other materials having sufficient mechanical, thermal, and wear-resistant characteristics may also be employed. Also, while certain portions of the apparatus have been shown as being integrally formed as one piece, they may also be formed as separate pieces which are attached to each other by mechanical means. For example, end member 26 may be separate from shaft 24 and attached thereto by a screw and threaded recess arrangement, so that end member 26 is easily removable from shaft 24. Accordingly, it is intended by the appended claims to cover all such modifications and changes as fall within the true spirit and scope of the invention.

The invention claimed is:

1. Apparatus for feeding an extrudable fuel to a presurized combustion chamber defined by a combustion chamber wall, said apparatus comprising:
    an extruder body having a generally cylindrical shaped extrusion channel defined therethrough, the end of said channel being bevelled radially outwardly and in flow communication with the combustion chamber;
    a screw extruder situated in said extruder body for transporting fuel to the combustion chamber, said screw extruder being movable in the axial direction and having a frusto-conically shaped end member, the vertex angle of the frusto-conically shaped end member corresponding to the bevel angle at the end of the extruder body, the bevelled end of the extruder body and the frusto-conical end of the extruder defining an annular opening having a reduced cross-sectional area relative to the passage transferring fuel, so that the extruded fuel is compacted, said annular opening being closable by the axial movement of said screw extruder seating said frusto-conically shaped end member against the bevelled end of the generally cylindrically shaped extrusion channel in the extrusion body to provide a pressure seal for the pressurized combustion chamber, even in the absence of fuel in the annular opening; and
    means for atomizing the compacted fuel after the fuel is introduced into said combustion chamber.

2. The apparatus of claim 1 wherein the cross-sectional area of said annular opening is adjusted by moving said screw extruder axially to control the amount of fuel introduced into said combustion chamber.

3. The apparatus of claim 1 wherein said atomizing means comprises an atomizing body at least partially surrounding the end of said extruder body, the inner surface of said atomizing body and the outer surface of said extruder body defining an atomizing gas channel in flow communication with said combustion chamber.

* * * * *